United States Patent [19]
Bettle

[11] Patent Number: 5,772,886
[45] Date of Patent: Jun. 30, 1998

[54] AQUACULTURE PROCESS

[76] Inventor: Griscom Bettle, 1660 Stone Ridge Ter., Sarasota, Fla. 34232

[21] Appl. No.: 681,155

[22] Filed: Jul. 22, 1996

[51] Int. Cl.⁶ .................................................. C02F 3/02
[52] U.S. Cl. ...................... 210/605; 210/607; 210/629; 210/760; 210/747; 261/117; 261/DIG. 75
[58] Field of Search ................................. 210/603, 605, 210/607, 621, 629, 747, 758, 760, 765, 220, 170; 261/36.1, 76, 116, 117, DIG. 75

[56] References Cited

U.S. PATENT DOCUMENTS

| | | | |
|---|---|---|---|
| 3,151,064 | 9/1964 | Lathrop | 261/117 |
| 3,655,343 | 4/1972 | Galeano | 261/DIG. 75 |
| 3,938,738 | 2/1976 | Nagel et al. | 261/DIG. 75 |
| 4,019,983 | 4/1977 | Mandt | 210/220 |
| 4,452,701 | 6/1984 | Garrett et al. | 210/220 |
| 4,695,378 | 9/1987 | Ackman et al. | 261/DIG. 75 |
| 5,340,484 | 8/1994 | Prince et al. | 261/DIG. 75 |
| 5,616,288 | 4/1997 | McDonald | 261/DIG. 75 |

FOREIGN PATENT DOCUMENTS 63-88025  4/1988  Japan .

Primary Examiner—Christopher Upton

[57] ABSTRACT

An aquaculture process for dissolving gas in liquid by impinging two or more streams substantially and directly one to the other wherein the two streams enter an impingement zone from conveying means of substantially equal shape with a velocity greater than 2 ft/sec, wherein at least one of the streams is a gas/liquid mixture and at least one of the streams passes through a venturi prior to impingement, the impingement of the two streams taking place above a water line of an environment being discharged into so as to offset the pressure of the fluid discharging from the process, the impingement of the two streams further taking place in a contained environment such that the fluid dynamics of each stream just prior to and after the point of impingement is substantially turbulent, whereby after impingement, the streams are discharged at velocities that have substantially turbulent fluid dynamics with the discharge from the impingement zone not changing direction before discharge to the surrounding environment, the gas/liquid being partially recirculated back to the impingement zone with a recirculation ratio that is sufficiently large so as to maintain the gas concentration in the liquid substantially constant.

11 Claims, 6 Drawing Sheets

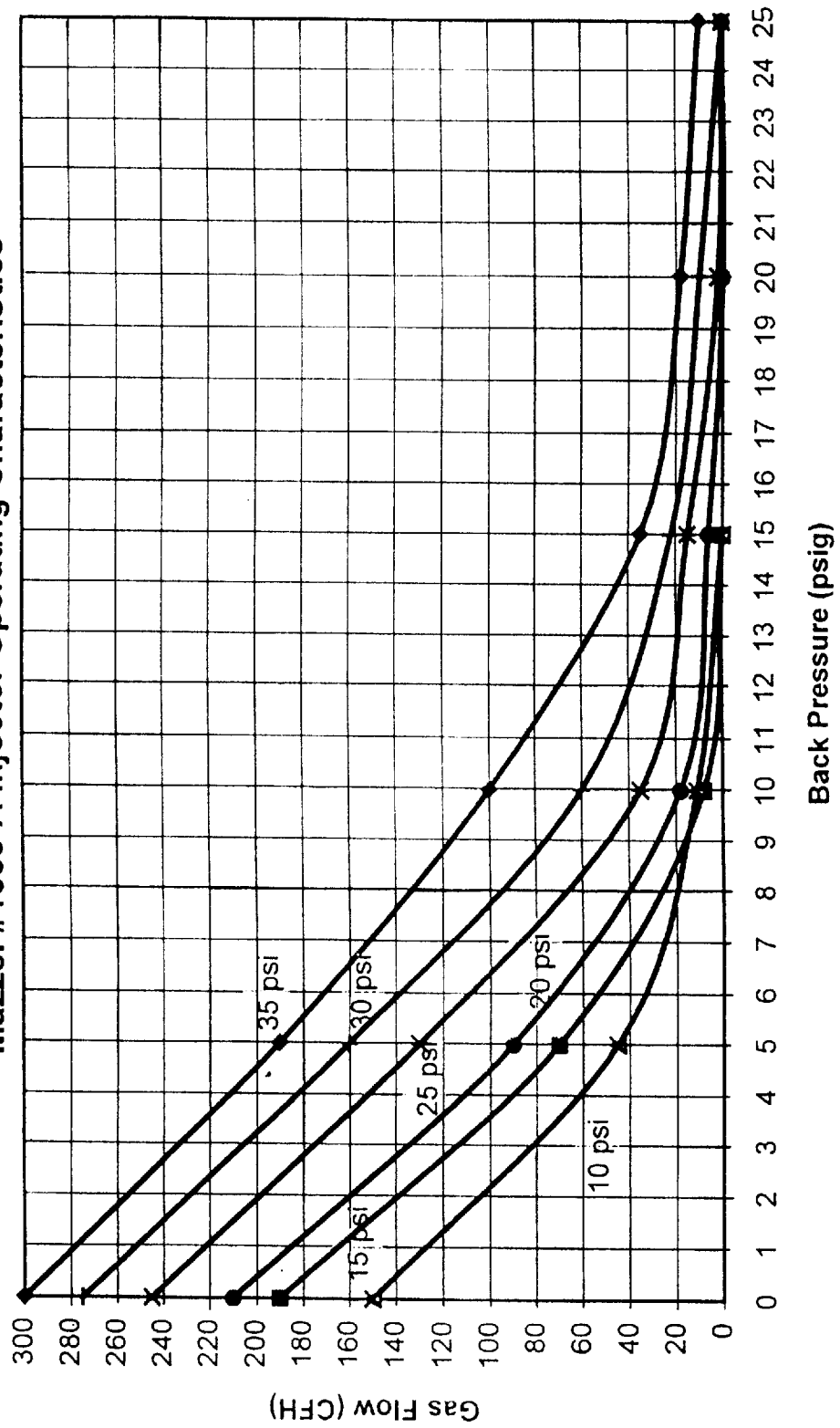

BUBBLE DISTRIBUTION

AQUACULTURE PROCESS

FIELD OF THE INVENTION

The present invention relates to an aquaculture process for nourishing fish through adding gas to liquid streams which comprises a more energy efficient way to add gas, such as oxygen or ozone, to a liquid, such as contaminated aqueous streams. Two eductors are aimed at each other and directly impinge in a closed environment at particular velocities. The subsequent impact shatters the already small bubbles into micro bubbles. By elevating the apparatus above the. discharge water level sufficient to offset the pressure loss due to the impact and discharge, high levels of gas are entrained in the discharge stream.

BACKGROUND OF THE INVENTION

In the field of aquaculture, a substantial number of aqueous streams must be treated to meet governmental laws and regulations to certify them for aquaculture, for drinking purposes, for release into the environment, or to supply sufficient oxygen, for example, for aerating ponds to grow fish. Non limiting examples of such aqueous streams include: those waste water streams emanating from municipal water supplies, streams from the petrochemical, refining and chemical; waste treatment plants, particularly lagoon systems with algae populations. Of particular interest are commercial fish ponds. When oxygen levels are too low (dissolved oxygen (DO)<5 ppm), fish are stressed, which causes them to move more rapidly, using more oxygen and requiring more food. Ideally oxygen levels of 7–10 ppm should be maintained for the economic production of healthy fish. If these levels can be sustained, production density can be raised, food requirements will be minimized, growth will accelerate, and fish will be healthier.

Experiments on wastewater aeration started in England as early as 1882. In the early experiments, air was introduced through open tubes or perforations. More recently, diffusers of a variety of types from porous ceramic plates, to slit bladders to perforated plates were tried. An alternate approach was to use mechanical means for aeration. These included paddles, turbines, venturis and air added under pressure in U-tubes.

More recently, Dickerson (5,397,480) patented a novel eductor that created micro bubbles in a pressurized tank. This invention was used to transfer high doses of ozone to oxidize recalcitrant paper making wastes. A Canadian company, Aquatex, has commercialized a product where a standard venturi discharges into a controlled pressure vessel for sufficient time to dissolve and supersaturate the water with oxygen or ozone. This combination of small-bubble-making in the venturi with further size reduction by added back pressure and then extraction of only the small bubbles creates a very fine bubble population with a mean diameter of 0.007 mm. St. Pierre (U.S. Pat. No. 5,460,731) describes this process as also having large gas bubbles separated mechanically and later micronized by gravity impingement of the liquid/small-bubble-stream on top of the previously separated large bubbles. An engineered down flow velocity extracts the small bubbles and allows the oversized bubbles to float to the top where they are broken up again by new impinging liquid. All this takes place in a pressurized large diameter column.

Air Products, Inc. has developed an impingement mixing aeration device based on a patent by Damann (U.S. Pat. No. 4,735,750). In this system, two streams of gas/liquid mixture are aimed at each other in the middle of a reactor filled with water. The impingement velocity fractures the already small bubbles into micro bubbles. Unfortunately, the impingement zone is not tightly contained. This creates some glancing blows that do the opposite and some of the once-small bubbles coalesce into large bubbles. The result is a non-ideal bi-modal distribution of bubble sizes.

MacLaren (U.S. Pat. No. 5,484524) describes a non impingement apparatus for improving productivity of a sewage treatment plant by micronizing bacteria in a venturi and recirculating through an immobilized reactor bed. In this invention, he reports significant reductions in residence time for the bacteria by increasing bubbles and bacteria surface area. Using the impingement technology of the present invention will further reduce the necessary residence time by further increasing dissolved oxygen and the appropriate surface areas.

Earlier practitioners (Baker, U.S. Pat. No. 4,085,171) describe aiming two venturis at each other, at a variety of angles and allowing the commingled sprays to strike the surface of the pond to create a bubble population with some smaller bubbles.

In the Manual of Practice FD-13, *Aeration,* 1988, the authors describe the important factors in efficient aeration. Some of the key points are:

1. "the rate of transfer is proportional to the area of contact between the liquid and the oxygen. This is the basic advantage of small bubbles. . . There seems to be a limit to the effectiveness of decreasing bubble size. . . Although smaller bubbles may increase oxygen transfer efficiency (OTE), the additional power required to offset the increased head loss across the diffuser may negate any potential savings.". . . page 33.
2. "Uniformity of air distribution, both across an entire aeration system and within individual diffusers, is of utmost importance if high OTE is to be obtained . . . if larger bubbles form . . . OTE will decrease . . ." page 34.
3. "In general, the standard oxygen transfer efficiency (SOTE) for diffused air systems increases with diffuser depth because of increased oxygen partial pressure and increased contact time with the bubble and mixed liquor". . . page 34.
4. "All types of diffusers occasionally become fouled with use. Diffuser fouling is generally detrimental in wastewater treatment . . ."... page 41.

In the *Handbook of Ozone Technology & Applications,* 1982, Rice et al, page 163, the terminal velocity of a single bubble is plotted versus that bubble's radius. For bubbles with a radius less than 1 mm, the terminal velocity is 43 cm/(sec*mm) times radius (vel=43*r). Thus, for a given water depth, the smaller the radius of the bubble, the longer the residence (dissolving) time in the water column.

In Metcalf and Eddy's *Wastewater Engineering* text book, 1991, page 134, they describe "the principal elements of Operations and Maintenance (O&M) costs are labor, energy, chemicals and materials and supplies". Even though the science of aeration has been studied for over a century, there is still a need to find more efficient ways to add gas to aqueous liquids.

Most aeration systems use a mechanical means to add air to water. This involves either a high maintenance air compressor pumping air through a stagnant pond, or a mechanical device to move the water through the atmosphere and thus dissolve oxygen in the water. Still a third way is to pump water through an air/water contacting device such as a static mixer, an eductor, or a venturi. Dickerson suggests a fourth way, to pump gas through a compressor and water through a pump and mix them under pressure in a novel eductor. All these prior art strategies use considerable energy at considerable expense per cubic foot of gas transferred per kWh.

The venturi method as practiced by Aquatex has the advantage of apparent simplicity, mechanical conversion of all entrained gas into micro bubbles and the lack of fouling. Water is pumped through a venturi, held under pressure until it is dissolved and supersaturated (much as the carbonated soda industry does when water is carbonated with carbon dioxide). The disadvantage of this approach is that the gas induction capability of a venturi is inversely proportional to the back pressure. That is, as the discharge pressure increases, less total gas is added through the venturi. So the Aquatex approach has tradeoffs . . . they increased back pressure to get better dissolving via uniformly small bubbles, but added less total gas to the water column.

Dickerson tries to solve this problem by pressurizing the gas and forcing it to mix in his novel eductor. His trade off is higher energy consumption for pressurizing the gas.

It would reduce the overall cost of aeration if a method were available that could produce a narrow distribution of micro bubbles, with a high gas-to-liquid flow rate, that was impervious to fouling, that did not require a high maintenance, high cost gas compressor, yet still transferred high volumes of gas.

SUMMARY OF THE INVENTION

In accordance with the present invention, there is provided a method and apparatus for adding gas to liquid streams, preferably oxygen or ozone to aqueous streams. There is provided a process for directly impinging two or more streams containing liquid and gas in a contained environment such that substantially all the gas and liquid directly impinge one on the other at velocities such that each stream is substantially turbulent before impact, then subsequently discharging as a combined turbulent stream.

In a preferred embodiment of the present invention, gas is drawn into two opposing venturis by liquid flowing through said venturis. In one preferred embodiment the venturi discharge velocity is 4 ft/second in each venturi. The two venturi streams meet at opposite ends of a piping T and discharge through the down leg of the T through a long straight pipe into the bottom of a pond to be aerated. In a second preferred embodiment, water flow is split with the uppermost portion communicating through a venturi and the bottom most portion communicating through a connecting means such that the two flows directly impinge on the other. The combined flows discharge from the point of impingement along an extended circumference such that the discharge area of the cylinder defined by the distance separating the two communicating means and the immediate circumference of the means is equal to about half the combined cross sectional areas of the two fluid communication means. There may be one or more venturis in this embodiment.

In another preferred embodiment, the venturis and the point of impingement are elevated above the water line of the discharge pond. In still another preferred embodiment, the venturis and point of impingement are further elevated above the water line a distance equal to the underwater discharge depth plus a height substantially equal to the pressure drop caused by the force of impingement and subsequent discharge to the pond. In this embodiment, there is no back pressure on the venturis and total gas flow is maximized. In another embodiment, the discharge path does not turn any corners, thus reducing the potential for bubble coalescing.

In yet another preferred embodiment, pairs of impinging venturis are linked together in parallel.

In yet another preferred embodiment, gas/liquid from one venturi and water from a recycle means are directly impinged one at the other at substantially turbulent velocities. Part of the stream is discharged and part of the stream is recycled back to said impingement point. In this embodiment, there is only one venturi.

In yet another preferred embodiment, the impingement technology is used to accelerate the performance of sewage treatment plants or septic systems. In this embodiment, the recirculating water contains bacteria from the waste water and sludge. Not only are the bubbles micronized, so are the bacteria. This has a double effect of increasing dissolved oxygen and increasing the surface area of the microorganisms.

BRIEF DESCRIPTION OF THE FIGURES

FIG. 2 is a chart of manufacturer's literature for Mazzei venturis, Model 1583-A showing the relationship between total gas added as a function of venturi back pressure for a variety of water inlet pressures.

DETAILED DESCRIPTION OF THE INVENTION

The instantly claimed invention can be practiced on any aqueous stream which contains an unacceptable level of impurities such as suspended matter, organics, algae, sludge, dissolved mineral matter, dioxins, microorganisms, and color bodies or merely lacks sufficient gas, such as oxygen or ozone in the liquid. In particular, commercial fish growing operations require large levels of dissolved oxygen. Fish tend to gather in areas of higher dissolved oxygen. When oxygen levels are low, fish are stressed and tend to move around more to find sufficient oxygen. More fish movement requires more feed and more total oxygen. Depending on variety of fish, when dissolved oxygen reaches a critically low level, mass suffocation can occur within 20 minutes. In warmer water ponds, it is more difficult to maintain sufficient oxygen because oxygen solubility declines as water temperature increases.

Fish farming is also a low margin business, so operating costs are important. Operating costs are a combination of energy costs to add oxygen, and the allocated costs of occasional catastrophic failure of the entire crop due to failure of the oxygen dissolving system.

Typically, air is pumped into distribution headers to form relatively coarse bubbles. The air is pumped with air compressors or blowers, both of which are relatively high maintenance, high energy devices. Very reliable water pumps are used to recirculate water. In some installations, ozone gas is added to the air stream to clean the water and control algae blooms.

Adding oxygen-in-air to water is a very well known art, and many alternate approaches are in commercial practice all over the world. In general, they all try and make small bubbles, they attempt to be non fouling and to have long MTBF's (mean time between failures). In general, the efficiency increases as bubbles get smaller. The industry uses a standardized clean water test to measure the oxygen transfer efficiency, called SOTE (standard oxygen transfer efficiency). Most handbooks report actual field efficiencies to be 40%±20% versus SOTE. In other words, there is considerable room for improvement in practiced efficiencies.

As important as efficiency is, real fish breath moles of oxygen, not efficiency. That is, a gross amount of oxygen has to be dissolved to satisfy the farmer's need. There are four key factors that affect the macro amount of oxygen transferred in a given water situation: The surface area per bubble, the total number of bubbles, the time the bubble is in contact with the water and the concentration of oxygen in the water adjacent to a bubble. These are factors that are hard to measure directly, but relative measures that demonstrate real improvements are easy to execute.

Figure 1:
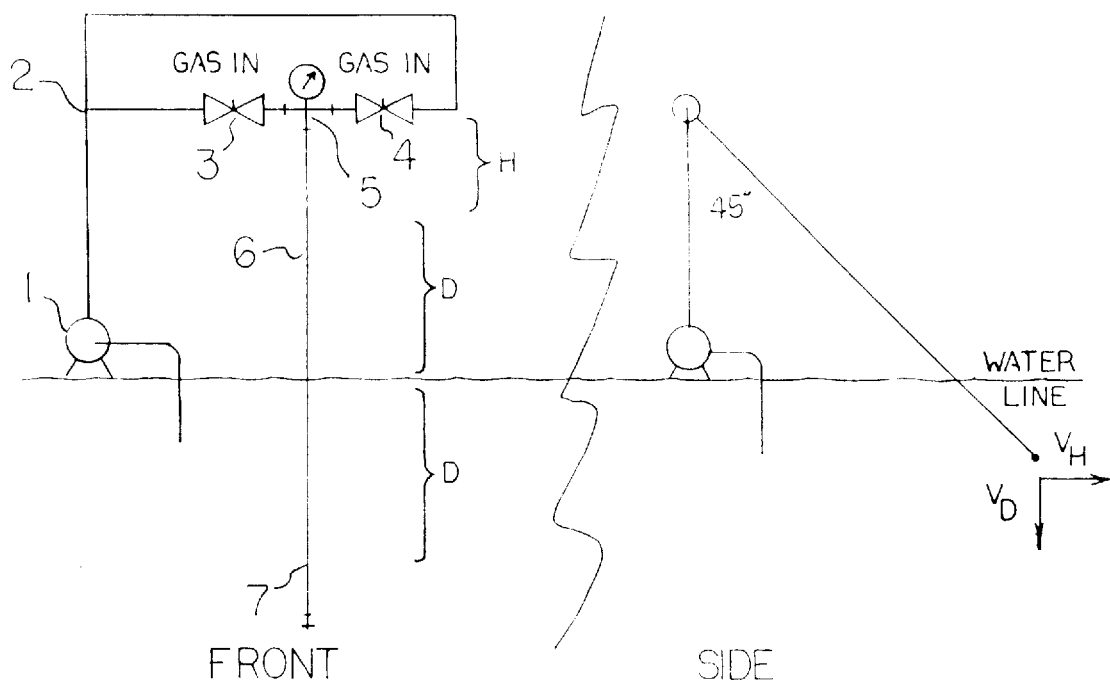
FIG. 1 is a simplified schematic of the experimental impinging apparatus in two views.

Turning now to FIG. 1 hereof, there is shown a test apparatus of the present invention wherein water from a brackish Louisiana bayou is pumped into two identical Mazzei # 1583-A venturis 3,4 at substantially identical pressures. The two venturis discharge directly at each other through a pipe T 5. The pipe T 5 discharge is angled away from the horizontal at a 45° angle to the plane of the body of water. The impinging venturis are 11 feet (D+h) above the water line and the 45° discharge means continues down to the water line until finally discharging through a piping cross at a depth of 6 feet (D).

As a result, the gas/water mixture has a down discharge velocity vector (Vd) and a horizontal discharge velocity vector (Vh). When water flows through a venturi, gas is drawn in, intimately mixed with the water and discharges as a two phase fluid with uniform, relatively large bubbles. It is well known that when gas/liquid mixtures impinge on fixed surfaces or on a second gas/liquid stream, that the uniform large bubbles from the venturi are changed into a broader distribution of bubble sizes, some micronized and some very large. St. Pierre ('731) recognized this and invented an apparatus to separate out the oversize bubbles and remicronize them under above-atmospheric pressures.

Surprisingly, it was discovered that when a gas/liquid stream directly impinges on a second stream and that the "collision" is contained in a pipe with a single, substantially equal or smaller outlet cross sectional area, that substantially all the entering bubbles are fractionated. Further, it was discovered that there are critical impingement velocities. Velocities too slow did not fracture the bubbles and velocities too fast used too much energy and thus reduced the overall efficiency of the system.

Figure 3:
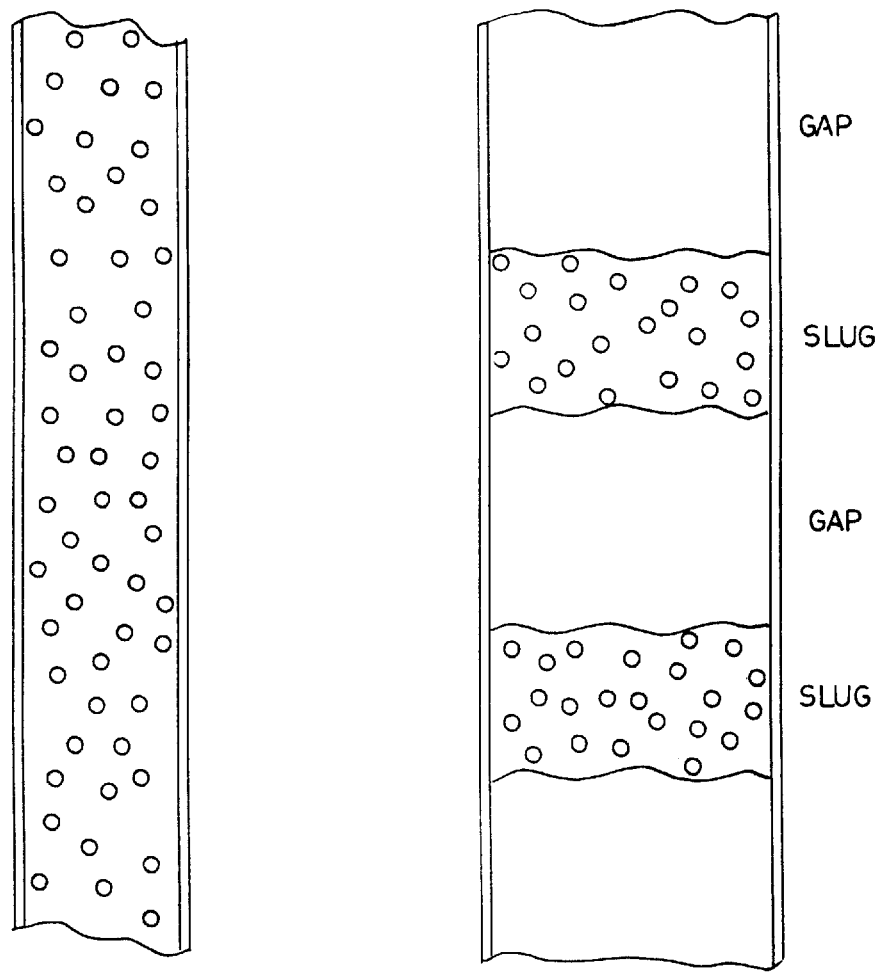
FIG. 3 is a sketch showing the distribution of bubbles and liquid in the venturi discharge downcomer at recommended diameter and at an oversize, lower pressure drop diameter.

It is well known that bubbles tend to coalesce when they turn corners. It is also well known that the total amount of gas pulled through a venturi is directly proportional to the pressure at the discharge of said venturi, as shown in FIG. 2, a plot of published data for the Mazzei 1583-A venturi. FIG. 2 shows the amount of gas pulled into the venturi as a function of the pressure at the discharge of said venturi for a variety of liquid inlet pressures. It is also well known that fluids require energy (pressure drop) to flow through pipelines. What is not known is that gas/liquid mixtures separate into gas/liquid "slugs" and gas-only "gaps" when flowing down oversized lines. As shown in FIG. 3, these gaps are believed to be low pressure zones that remove gas bubbles from the liquid. The net effect is to cause coalescing in a straight downcomer pipe, and a loss of the narrow distribution, small bubble population created by the impingement method.

Referring again to FIG. 1, a novel apparatus was designed to impinge two gas/liquid streams in a contained pipe at preferred individual velocities of about 4 feet/second, then discharge the combined stream at 8 feet/second to the required depth without the fluid changing direction or allowing slugs and gaps to appear in the downcomer means. Further this novel apparatus was elevated above the water line sufficient distance (h) such that the back pressure at the impingement point was substantially equal to atmospheric pressure. That is, there was substantially zero back pressure on the venturi because the elevation (h) offset the pressure drop due to fluid flow in the discharge means.

Referring once more to FIG. 1, Pump 1 draws water from the bayou and pumps it through connecting means 2 to venturis 3 & 4. Venturis 3 & 4 directly impinge in T 5. T 5 subsequently discharges through conveying means 6 to the bayou through pipe cross 7. Liquid and micro bubbles spread out from pipe cross 7 away from the impingement point in T 5. In a series of experiments detailed in Table 1, the diameter of T 5 and conveying means 6 was changed from 1", to 1¼", to 1½" and finally 2". The pressure from pump 1 was varied from 10 psig to 30 psig. Changing pressure changes the liquid flow slightly and the gas flow through venturis 3 & 4 substantially as shown in FIG. 2, a plot of the Manufacturer's literature comparing gas flow to venturi back pressure.

FIG. 2 demonstrates that dramatic increases in the amount of gas passing through a venturi can be enormously increased merely by reducing the back pressure. For example in a Mazzei 1583-A venturi, almost 15 times more gas is mixed with liquid @ zero back pressure versus 10 psig back pressure. For example, if the Aquatex system was operated at only 5 psig back pressure versus this invention @1.5 psig back pressure, the Aquatex system would have to operate @ 27 psig inlet pressure vs. 15 psig for the instant invention to transfer the same amount of oxygen. This small difference consumes more than 50% more energy per cubic foot of air injected into the water. The apparatus in FIG. 1 was elevated 11 feet off the waterline to reduce back pressure and save energy by requiring less inlet pressure.

The back pressure at the discharge of venturis 3 & 4 is equal to the depth of pipe cross 7 below the water line plus the pressure drop in the impingement T 5 plus the fluid friction pressure drop from traveling down conveying means 6 minus the elevation of T 5 (D+h). From the data in FIG. 2, it is advantageous to minimize the pressure drop in conveying means 6. However, if an oversize line is used, slugs and gaps appear which alters the eventual bubble size distribution in the bayou as shown in FIG. 3.

Referring now to Table 1, the experimental data, it is shown the criticality of these seemingly small details. In the experiment, bayou water (BOD=5 mg/l; TSS =30 mg/l) was pumped through the FIG. 1 apparatus at different pressures and with different diameter impingement T's 5. The time for bubbles to rise was determined by allowing the system to reach equilibrium, then shutting pump 1 off. The rising time was the time from pump shut off until bubbling ceased. Venturi back pressure was measured with a pressure gauge 8 installed on T 5. It was observed that the experimental conditions created large variations in the area over which bubbles from cross 7 were observed. These data are also recorded.

Figure 1A:
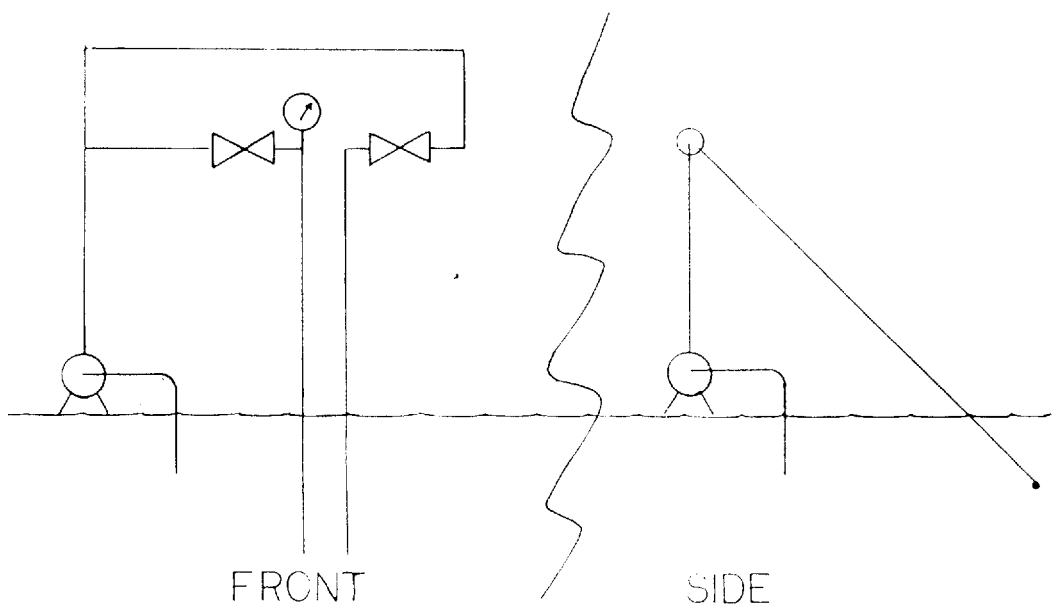
Figure 1a is a simplified schematic of the parallel apparatus used as a control. It is also shown in two views.

In a second experiment, apparatus described in FIG. 1 was altered as shown in FIG. 1a. Instead of the venturis impinging in a T, T 5 was replaced with two pipe elbows 9 & 10 and separate conveyance means 11&12. Pipe cross 7 was replaced with two pipe T's 13 & 14. The net effect was to simulate the apparatus in FIG. 1 with gas/liquid flows in parallel rather than by impingement. There was up to a 7-fold increase in efficiency with the two venturis in contained impingement versus the same two venturis in parallel.

TABLE 1

EXPERIMENT 1
BAYOU AERATION

| inlet pressure (psig) | back pressure (psig) | bubble rise (sec) | bubble coverage (ft$^2$) |
|---|---|---|---|
| 1" IMPINGEMENT T | | | |
| 10 | 0 | 8.47 | 4 |
| 15 | 3.5 | 8.47 | 16 |
| 20 | 6.5 | 9.96 | 25 |
| 25 | 9.5 | 10.14 | 25 |
| 30 | 11.5 | 11.77 | 25 |
| 1¼" IMPINGEMENT TT | | | |
| 10 | 0 | 8.73 | 16 |
| 15 | 1.5 | 8.70 | 25 |
| 20 | 2.25 | 9.38 | 25 |
| 25 | 3.0 | 9.43 | 25 |
| 30 | 3.75 | 9.91 | 36 |
| 1½" IMPINGEMENT TT | | | |
| 10 | 2.0 | 7.50 | 4 |
| 15 | 2.25 | 7.31 | 16 |
| 20 | 3.0 | 8.07 | 16 |
| 25 | 3.75 | 7.96 | 25 |
| 30 | 4.0 | 8.12 | 36 |
| 2" IMPINGEMENT T | | | |
| 10 | 0 | 5.59 | 1 |
| 15 | 1.75 | 7.06 | 9 |
| 20 | 2.0 | 7.38 | 16 |
| 25 | 2.0 | 7.23 | 16 |
| 30 | 2.0 | 7.20 | 25 |
| 1¼" PARALLEL ELS | | | |
| 10 | 0 | 5.60 | 1 |
| 15 | 0 | 6.67 | 1 |
| 20 | 0 | 6.89 | 4 |
| 25 | 0 | 6.94 | 4 |
| 30 | 0 | 6.23 | 9 |
| 1½" PARALLEL ELS | | | |
| 10 | 1 | 5.60 | 1 |
| 15 | 1 | 6.67 | 1 |
| 20 | 0 | 6.89 | 4 |
| 25 | 0 | 6.94 | 4 |
| 30 | 0 | 6.23 | 9 |

Energy Consumption with four pairs of venturis (8 total)

| inlet pressure (psig) | horsepower (centrifugal) | Liquid flow per venturi (gpm) |
|---|---|---|
| 10 | 1.9 | 15.1 |

TABLE 1-continued

EXPERIMENT 1
BAYOU AERATION

| 15 | 2.6 | 18.1 |
| 20 | 3.8 | 20.5 |
| 25 | 5 | 23.0 |
| 30 | 6.9 | 25.3 |

Chart 1 compares the total macro gas surface area efficiency with changes in impingement velocity achieved by changing the impingement T diameter. The differences were most pronounced at 15 psig, shown in Chart 1. The impact of the impingement velocity is dramatic, in fact there is a 7 fold improvement in gas surface area efficiency by impinging directly at the optimum velocity versus traditional parallel processing.

Chart 2 compares the total gas surface area created by the two venturis per horsepower in consistent units at a variety of inlet pressures. The top line compares the results for direct impingement, while the lower line compares the results for parallel configuration. It is immediately obvious that direct impingement creates more total gas surface area per kilowatt hour than with parallel flow. This is an expected result based on the prior art work with gas/liquid impingement processes. What was unexpected is that there is a clear impingement optimum at 15 psig.

The units for calculating relative gas area need explanation. The total gas flow was calculated from the manufacturer's data shown in FIG. 2 since the back pressure and the inlet pressure are known. The total gas in the water column was calculated by using the calculated total gas flow (ft$^3$/sec) times the number of seconds (sec) it required for the gas to cease rising to the surface after the pump was shut off. The surface area of the individual bubbles was calculated indirectly. Since the gas/liquid mixture was discharged at 45° to the water surface, there was a substantial horizontal water velocity component. It is well known that bubbles smaller than 1.0 mm in radius have a terminal velocity equal to 43 cm/(sec*mm) times the bubble radius (mm) . . . Rice, *Handbook of Ozone Technology and Applications*, page 163. Although the amount of water flowing through the venturis varied somewhat with inlet pressure, the variation is nominal (Table 1). Therefore the horizontal water velocity was essentially constant throughout the experiment protocol, and the vertical buoyancy force was also constant because the discharge depth was unchanged in all experiments. Therefore, a particular bubble would be entrained horizontally only as its own radius dictated. Thus the horizontal distance the bubble travels is directionally proportional to the bubble radius. Since bubble surface area is proportional to the square of the bubble radius, the bubble surface area is proportional to the area over which bubbles percolate to the surface. To get a relative measure of the macro surface area, one multiplies the total gas flow times the time to rise times the percolation surface area. To measure the relative energy efficiency, this macro surface area term is divided by the horsepower required with typical centrifugal pumps to move the liquid at specified pressures.

Observations during the experiment verified this procedure. With relatively inefficient apparatus set-ups, large bubbles rose up close to pipe cross 7. With more efficient operation, the bubbles were hardly visible, but the water surface was elevated relative to the adjacent, gas-free water.

Figure 4:
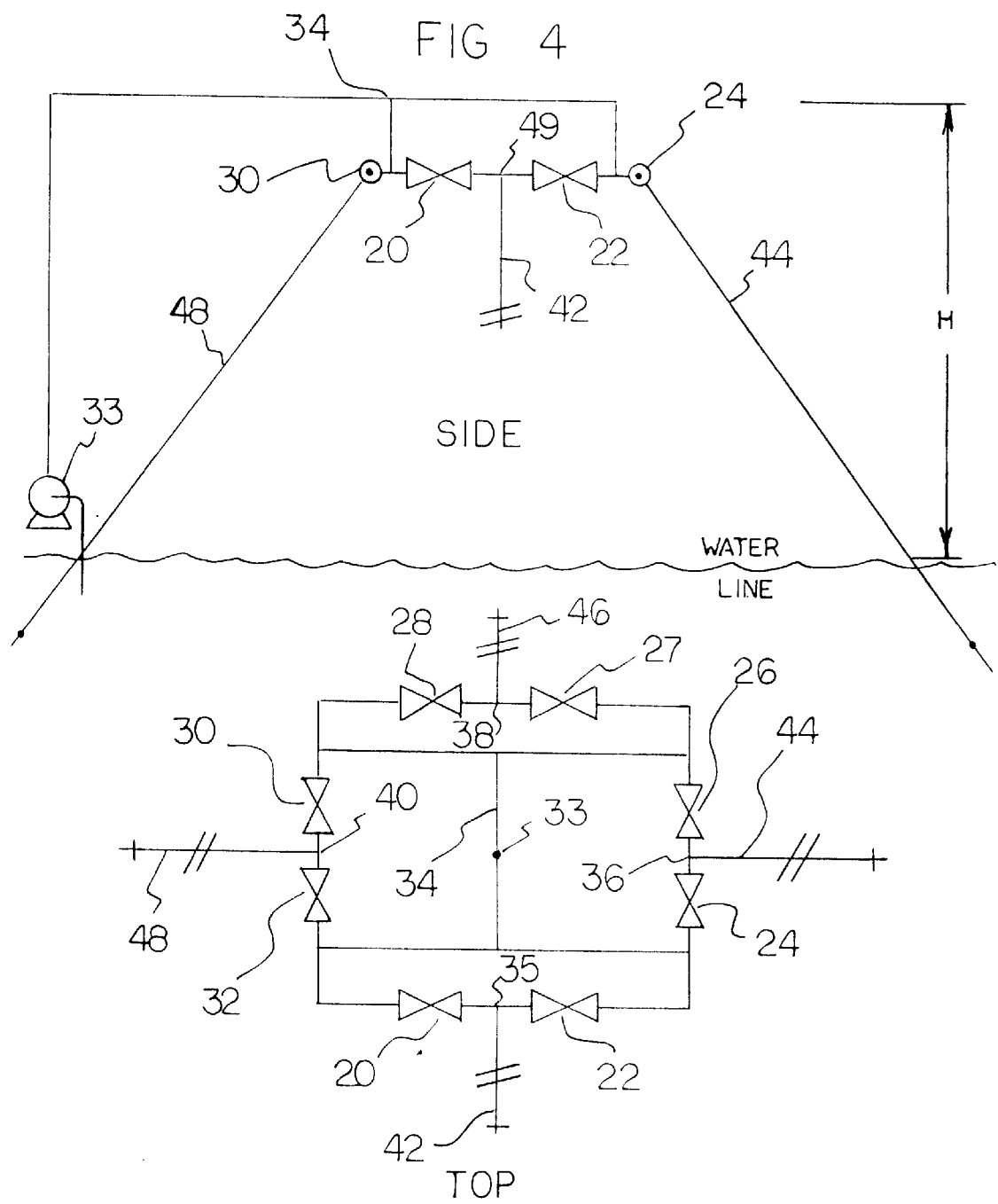
FIG. 4 is a sketch of a production apparatus using four pairs of venturis.

In a preferred embodiment based on the present invention, eight venturis (4 impinging pairs) were arranged in a square as shown in FIG. 4. (This apparatus was used to determine the energy term in the efficiency calculation. These data are shown in Table 1). The velocity at impingement was 4 ft/sec and 15 psig, the optimum operating point. The discharge legs for four pairs of venturis covered an area of almost 5,000 ft$^2$ in a Louisiana fish pond with striped bass. The energy consumption for this aeration was 3 hp. The results demonstrate that a simple system, using off the shelf parts and chemical industry-type water pumps are capable of aerating large fish ponds more efficiently than prior art devices.

Referring now to FIG. 4, this preferred embodiment has four pairs of impinging venturis (20 & 22, 24 & 26, 27 & 28, 30 & 32). Water is pumped from the pond through pump 33 to connecting means 34 which distributes water substantially evenly to all eight venturis. The venturi pairs impinge directly in T's 35, 36, 38 & 40 then discharge, without a pipe changing the direction of the gas/liquid stream, through conveying means 42, 44, 46, & 48. The apparatus is elevated at height h sufficiently to make the pressure at 49 substantially zero gauge.

Those skilled in the art will recognize that many variations of this invention are possible. For example, in place of venturis, any other gas/liquid mixer is possible prior to impingement. Non limiting examples are mixing gas and liquid in a static or vortex shedding mixer then impinging.

Figure 5:
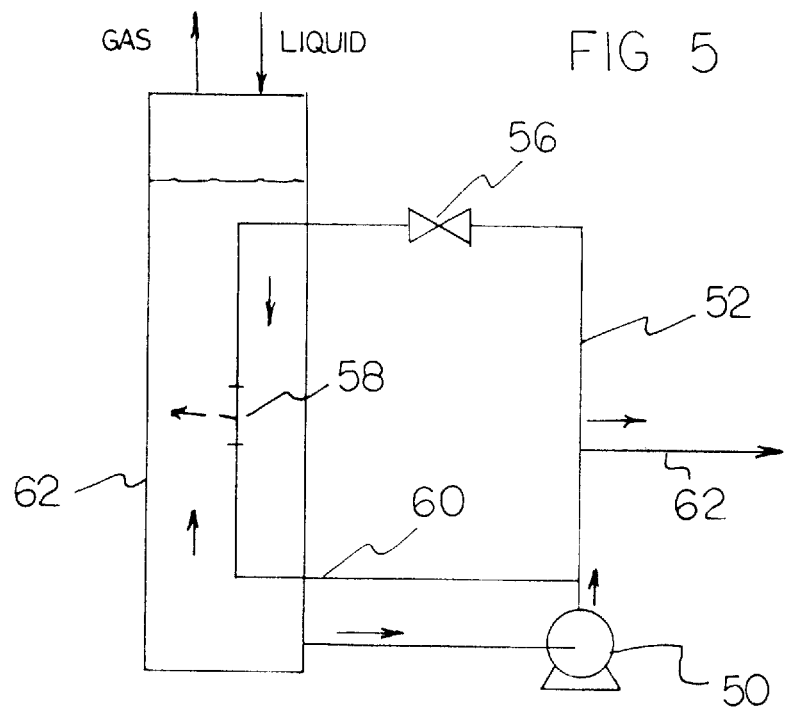
FIG. 5 is a sketch of a another preferred embodiment particularly useful for adding ozone to aqueous streams.

As shown in FIG. 5, another preferred embodiment uses a single venturi and a second water stream, with or without added gas, as the impinging fluids. This strategy also micronizes the bubbles and is particularly useful for dissolving high doses of ozone. As shown in FIG. 5, water is recirculated through pump 50 via means 52 to venturi 56 hence to impingement T 58 as well as through means 60 also to T 58 to discharge from T 58 into vessel 62 as fluid containing substantially micro bubbles only. As those skilled in the art will realize, the method shown in FIG. 5 builds up a large, constant concentration of ozone depending on the ratio of fluid in means (52+60) divided by the fluid exiting in means 62. In practice, because there are substantially no oversized bubbles reaching the inlet of the pump means, normal centrifugal pumps can pump fluid with gas/liquid ratios (v/v) of almost 0.5 to 1 without cavitation. (Those skilled in the art will recognize that the pump 50 outlet pressure is substantially reduced versus published pump curves for pure water because the apparent fluid is a significantly lower density than water alone.)

Figure 6:
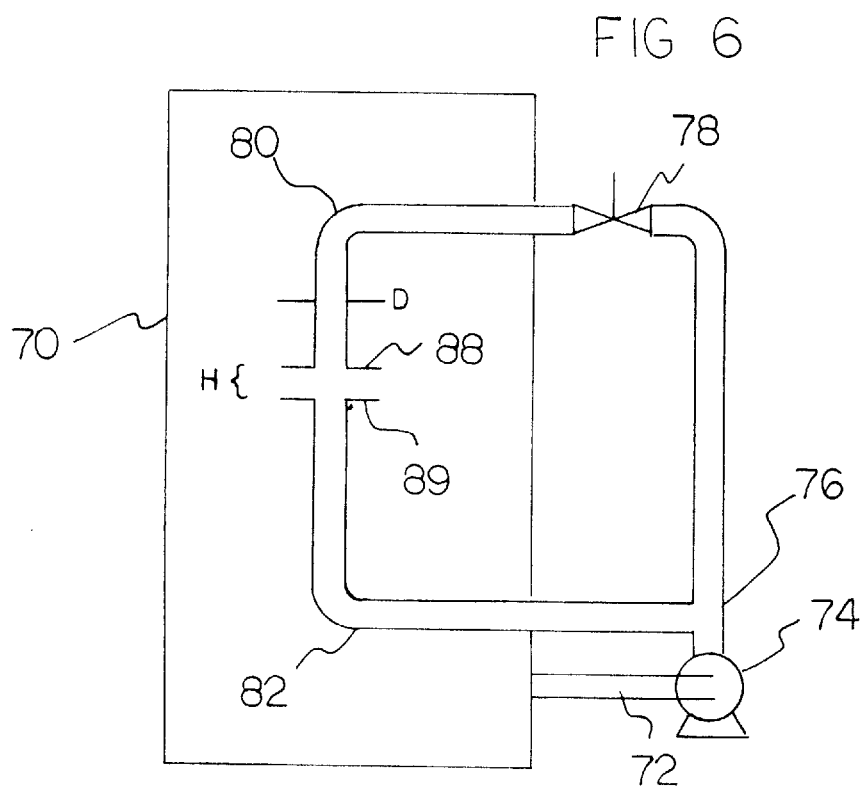
FIG. 6 is a sketch of still another preferred embodiment for adding ozone to aqueous streams.

Those skilled in the art will also recognize that a pipe T is only one means to contain the impingement process and to release the gas/liquid mixtures under control at turbulent velocities. The T technique is shown merely as an illustration. Another preferred embodiment of this novel impingement art is shown in FIG. 6. In FIG. 6, water is pumped from containment means 70 via connecting means 72 by pump 74. Pressurized water from pump 74 traverses through connecting means 76 to venturi 78 then to connecting means 80 and connecting means 82 to impingement area 84 at preferred velocities. Impingement area 84 connects connecting means 82 and 80 which are substantially directly aimed one at the other. The distance h, separating connecting means 82 and 80, each with diameter D, is such that the discharge cylinder ($\Pi D^2 h/4$) is substantially equal to the cross sectional area of connecting means 82 (or 80) alone. Substantially flat platforms 88 and 89 are attached to connecting means 80 and 82, respectively and act as stationary platforms to direct impinged flow substantially uniformly and radially away from impingement zone 84. This embodiment is particularly effective at uniformly distributing micro-bubble-containing fluid away from the impingement point. For example in a circular column of fluid, this embodiment distributes bubbles substantially equally across the diameter of a round tank.

Figure 7:
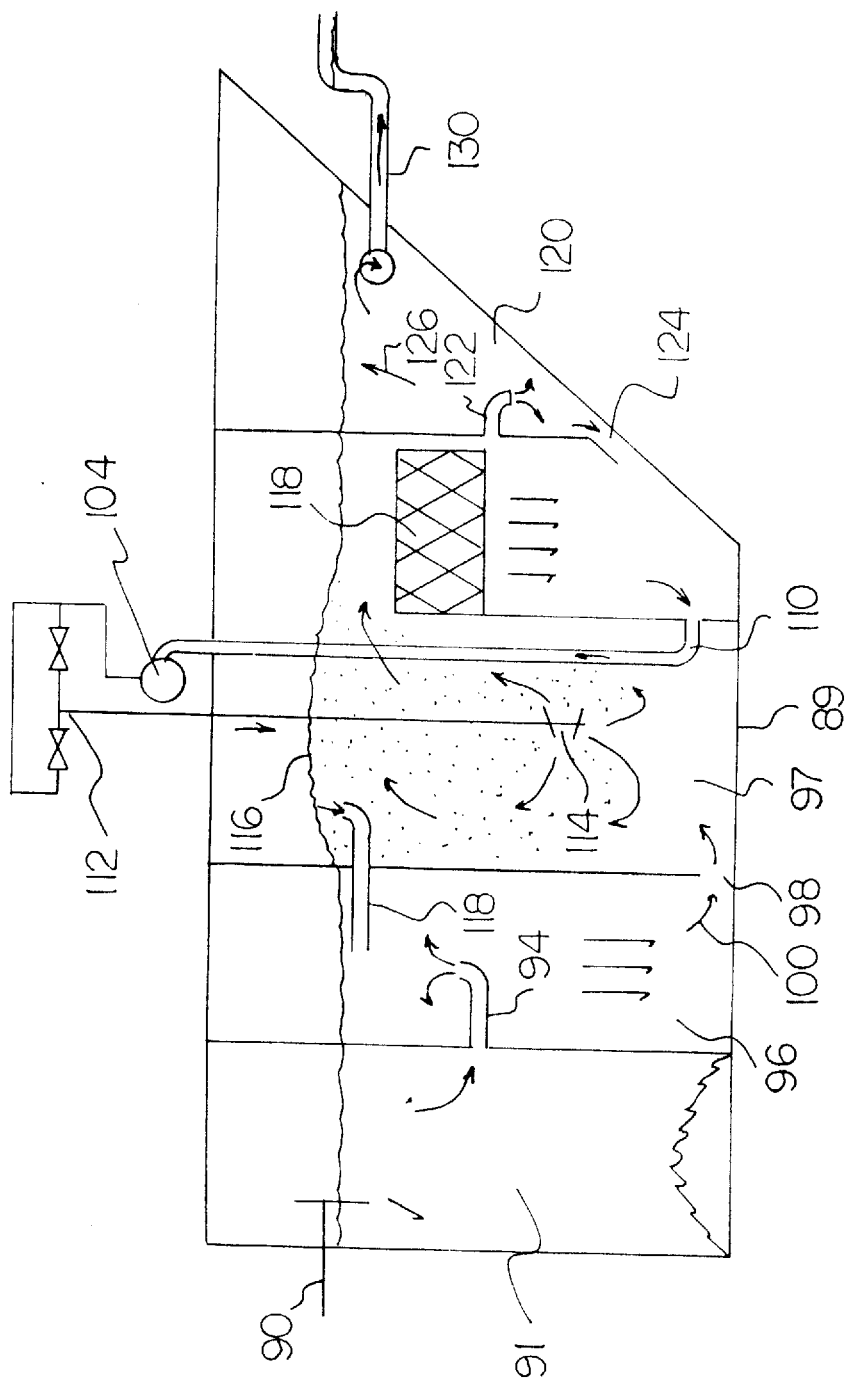
FIG. 7 is a sketch of a preferred embodiment for improving waste treatment.

FIG. 7 is a preferred embodiment of an improved wastewater treatment system that improves the reduction of BOD and reduces the level of nitrogen using the instant impingement technology. Treatment tank 89 receives raw sewage from connecting means 90 which discharges into anaerobic tank 91. Partially treated fluid transfers from anaerobic treatment tank 91 via means 94 into anoxic tank 96. Denitrification takes place in anoxic tank 96. Denitrified fluid 100 exits denitrifying tank 96 via connecting means 98 to aeration tank 97. Aerated water is recirculated through pump means 104 via connecting means 110 into impinging apparatus 112, previously described. Water with micronized gas and micronized bacteria discharge back into aeration tank 97 through connecting means 114. The gas creates an upwelling of gassy fluid that increases the elevation at surface 116. The increased elevation recycles a small portion of water back to anoxic tank 96 via connecting means 118. This partially oxidized fluid provides the small amount of oxygen for denitrification in anoxic tank 96.

Meanwhile gassy fluid flows over immobilized reactor medium 118, where the BOD is reduced. Treated fluid exits into clarifier 120 via connecting means 122. Sludge 124 settles out in a conventional way and clarified water 126 discharges through exit means 130 to discharge. What is unexpected is the ability to incorporate denitrification into a septic system by using impingement technology to cause nitrification to occur in tank 96. Flows are shown by directional arrows.

What is claimed is:

1. An aquaculture process for dissolving gas in liquid by impinging two or more streams of opposing flow substantially and directly one to the other wherein the two streams enter an impingement zone from conveying means of substantially equal shape with a velocity of about 4 ft/sec, wherein at least one of the streams is a gas/liquid mixture and at least one of the streams passes through a venturi prior to impingement, the impingement of the two streams taking place above a water line of an environment being discharged into so as to offset the pressure of the fluid discharging from the process, the impingement of the two streams further taking place in a contained environment such that the fluid dynamics of each stream just prior to and after the point of impingement is substantially turbulent, whereby after impingement, the streams are discharged at velocities that have substantially turbulent fluid dynamics with the discharge from the impingement zone not changing direction before discharge to the surrounding environment, the gas/liquid being partially recirculated back to the impingement zone with a recirculation ratio that is sufficiently large so as to maintain the gas concentration in the liquid substantially constant.

2. An aquaculture process for dissolving gas in liquid by impinging two or more streams of opposing flow substantially and directly one to the other at a velocity of greater than 2 ft/sec., at least one of which is a gas/liquid mixture, in a contained environment such that the fluid dynamics of each stream just prior to and after the point of impingement is substantially turbulent;

wherein the two or more streams after impingement are discharged at velocities that have substantially turbulent fluid dynamics such that the discharge from the impingement zone does not change direction before discharge to the surrounding environment and the impingement zone is elevated sufficiently above the water line to offset the pressure of the fluid discharging from the process.

3. An aquaculture process as in claim 2 where the two streams enter the impingement zone from conveying means of substantially equal shape.

4. An aquaculture process as in claim 2 where at least one of the streams passes through a venturi prior to impingement.

5. An aquaculture process as in claim 2 where gas/liquid mixtures are partially recirculated back to the impingement zone.

6. An aquaculture process as in claim 5 where the recirculation ratio is sufficiently large as to maintain the gas concentration in the liquid substantially constant.

7. An aquaculture process as in claim 2 where the gas is air.

8. An aquaculture process as in claim 2 where the gas is oxygen.

9. An aquaculture process as in claim 2 where the gas is ozone.

10. An aquaculture process as in claim 2 is incorporated in a sewage treatment system to cause micronization of the bacteria.

11. An aquaculture process as in claim 10 where a portion of the aerated flow is mixed with anaerobic sewage to create anoxic conditions.

* * * * *